United States Patent [19]

Su

[11] Patent Number: 4,851,478

[45] Date of Patent: Jul. 25, 1989

[54] ANTI-BLOCKING LLDPE FILMS

[75] Inventor: Tien-Kuei Su, Belle Mead, N.J.

[73] Assignee: Mobil Oil Corporation, New York, N.Y.

[21] Appl. No.: 242,102

[22] Filed: Sep. 9, 1988

[51] Int. Cl.[4] .................... C08L 23/16; C08L 23/20; C08L 23/26

[52] U.S. Cl. .................................... 525/240; 525/194

[58] Field of Search .................. 525/194, 240, 211

[56] References Cited

U.S. PATENT DOCUMENTS

| | | | |
|---|---|---|---|
| 3,758,643 | 9/1973 | Fischer | 525/194 |
| 3,806,558 | 4/1974 | Fischer | 525/194 |
| 4,311,628 | 1/1982 | Sabet et al. | 525/232 |
| 4,565,847 | 1/1986 | Bahl et al. | 525/240 |
| 4,722,973 | 2/1988 | Yamaoka et al. | 525/240 |

FOREIGN PATENT DOCUMENTS 143131  6/1985  European Pat. Off. ............ 525/211

*Primary Examiner*—Carman J. Seccuro
*Attorney, Agent, or Firm*—Alexander J. McKillop; Charles J. Speciale

[57] ABSTRACT

LLDPE films having excellent anti-block properties are disclosed which comprise a blend of LLDPE and vulcanized ethylene-propylene elastomer in the absence of additional antiblock additives, the amount of said vulcanized ethylene-propylene elastomer in said blend being sufficient to result in a film having a blocking force, when measured by ASTM method D-3354, of less than about 100 grams.

20 Claims, No Drawings

ANTI-BLOCKING LLDPE FILMS

BACKGROUND OF THE INVENTION

This invention relates to films of LLDPE having excellent anti-blocking properties. More specifically, this invention relates to films of LLDPE made from blends of LLDPE and vulcanized ethylene-propylene elastomers, and to such blends themselves.

Linear low density polyethylene (LLDPE) is a polymer whose commercial production is now well established. Linear ethylene polymers such as LLDPE are widely used in the extrusion of films because of their superior properties compared to high pressure polyethylene. One drawback of LLDPE films, however, is that they tend to block or adhere together in a nonpermanent but relatively strong bond after the films have been in face-to-face contact under pressure for some time. Rolls of the film may be difficult to unwind if the take-up tension has been great enough to cause a significant amount of blocking to take place, and surface imperfections may be created as the roll is unwound. Although the phenomenon of blocking may be put to use in certain laminate products, it would be desirable to have some means of reducing the blocking tendencies of the films.

There are known additives for improving the anti-blocking properties of films which are commercially available. They may be chosen from a wide variety of materials including inorganic compounds such as silica and silicates. It is well known that the use of inorganic antiblocking agents can adversely affect the physical properties of thin films. Accordingly, there is a need for a LLDPE film with excellent anti-blocking characteristics which avoids the disadvantages attendant to prior art films containing anti-block additives.

SUMMARY OF THE INVENTION

It has now been found that blends of LLDPE with a small amount of vulcanized ethylene-propylene elastomer can be used to prepare films with the advantages of LLDPE films but which also exhibit excellent anti-block characteristics. This invention therefore relates to films prepared from blends of LLDPE with vulcanized ethylene-propylene elastomer in the absence of any additional antiblock additives, the amount of said vulcanized ethylene-propylene elastomer in said blend being sufficient to result in a film having a blocking force, when measured by ASTM method D-3354, of less than about 100 grams, preferably less than about 50 grams. This invention further relates to the LLDPE/elastomer blends which can be used to prepare films with excellent anti-block characteristics.

DETAILED DESCRIPTION OF THE INVENTION

The LLDPE polymers which are suitable for use in this invention are known materials which are widely commercially available. The preparation of suitable polymers is described in U.S. Pat. No. 4,076,698, which is incorporated herein by reference. LLDPE is a copolymer of ethylene with minor amounts, usually less than 20%, of a higher alpha-olefin such as butene, hexene, methylpentene, octene, decene or dodecene. LLDPE is produced by the polymerization of ethylene in the presence of the requisite comonomer using a catalyst of the transition metal/aluminum alkyl type and the product is characterized by a linear structure, having long sequences of methylene units with periodic, uniform side chains distributed statistically along the molecular chain, whose nature depends upon the identity of the comonomer. The short chain branching interferes with crystallization of the main chains and since the crystalline regions display a higher density than noncrystalline regions, the ramification lowers the density. The density of LLDPE is generally below 0.940, preferably in the range of 0.90 to 0.935 (all densities referred to herein are relative densities), and it generally has a melt index (ASTM D-1238) of less than 3.

To achieve films with excellent anti-blocking characteristics, the LLDPE is blended with small quantities of vulcanized ethylene-propylene elastomer. The copolymerization of propylene with ethylene yields noncrystalline products that have rubbery behavior and are chemically inert because of their saturation. To develop full elastomeric properties, these copolymers are generally vulcanized (crosslinked), e.g. by use of peroxides cross-linking agents, radiation or traditional vulcanizing agents such as sulfur. The presence of crosslinks ensures the largely elastic recovery of the material after gross deformation. To gain sites for crosslinking, a diene monomer is often added; the resulting terpolymers are known as ethylene-propylenediene monomer (EPDM) elastomers. The major comonomers are 1,4-hexadiene, dicyclopentadiene and ethylidene norbornene. The term ethylene-propylene elastomer, as it is used herein, is intended to encompass ethylenepropylene copolymers (EPM) as well as ethylene-propylene diene monomers (EPDM).

The EPM or EPDM utilizable in the blends of this invention contain between about 40 and 80 weight percent ethylene. Such polymers can, in general, be prepared by copolymerizing ethylene, propylene and the diene in the presence of a Ziegler-Natta catalyst using techniques well known in the art. The ethylene-propylene elastomers should have a hardness of less than about 50D, preferably less than about 87A, measured according to ASTM D-2240.

Generally, the crosslinked ethylene-propylene elastomer should have melt flow characteristics similar to that of the LLDPE so that the elastomer can be easily dispersed in the LLDPE. The elastomer can be blended with the LLDPE in any suitable manner. It has been found advantageous to prepare a masterbatch containing the LLDPE which is rich in elastomer for blending with additional LLDPE to achieve the desired concentration of the additives.

The quantity of ethylene-propylene elastomer blended with the LLDPE is that amount sufficient to provide a film having a blocking force, when measured by ASTM method D-3354, of less than about 100 grams, preferably less than about 50 grams. Generally speaking, the blend will comprise about 0.025 to 10 weight % elastomer, preferably about 0.05 to 2.5 weight % elastomer.

The invention is illustrated by the following non-limiting examples.

EXAMPLES 1–7

A series of blends of LLDPE and vulcanized ethylene-propylene elastomer were prepared. The LLDPE used was a hexene copolymer of polyethylene having a Melt Index of 1 and a density of 0.918 g/cm$^2$ (NTA-101, from Mobil Chemical Company), and the elastomer had a density of 0.97 and a hardness of 55A (Santoprene 201-55, from Monsanto Company). Thin films of the blends were blown through a ¾" Brabender extruder with 1" annular die at a melt temperature of 400° F. (Examples A and 1-4) or a 2½" Sterling extruder with 6" annular die at a melt temperature of 440° F. (Examples B and 5-7). The blocking force is the peeling force required to separate the contacted films and was measured using ASTM D-3354. The antiblocking characteristics of the films prepared in this manner are presented, along with data for control LLDPE films having no elastomer or antiblocking additive, in the following Table.

| ANTIBLOCKING CHARACTERISTICS OF LLDPE FILMS | | |
|---|---|---|
| Ex. | Wt. % of Elastomer | Blocking Force, g |
| A | 0 | 152 |
| 1 | 1 | 46 |
| 2 | 2.5 | 0 |
| 3 | 5 | 0 |
| 4 | 10 | 0 |
| B | 0 | 190 |
| 5 | 0.25 | 20 |
| 6 | 0.50 | 20 |
| 7 | 1.00 | 18 |

The data in the foregoing table clearly illustrate the marked improvement in antiblocking characteristics achieved by the incorporation of small amounts of vulcanized ethylene-propylene elastomer into LLDPE films.

What is claimed is:

1. A film comprising a blend of LLDPE and vulcanized ethylene-propylene elastomer in an amount up to 10% in the absence of additional antiblock additives, the amount of said vulcanized ethylene-propylene elastomer in said blend being sufficient to result in a film having a blocking force, when measured by ASTM method D-3354, of less than about 100 grams.

2. A film of claim 1 which has a blocking force of less than about 50 grams.

3. A film of claim 1 in which said LLDPE has a density in the range of about 0.90 to 0.935.

4. A film of claim 1 in which said vulcanized ethylene-propylene elastomer is selected from EPM and EPDM.

5. A film of claim 4 in which said EPM or EPDM contain between about 48 and 80 weight percent ethylene.

6. A film of claim 4 in which said vulcanized ethylene-propylene elastomer has a hardness of less than about 50D, measured using ASTM D-2240.

7. A film of claim 4 in which said vulcanized ethylene-propylene elastomer has a hardness of less than about 87A, measured using ASTM D-2240.

8. A film of claim 1 in which said blend comprises about 0.025 to 10 weight % of said elastomer.

9. A film of claim 8 in which said blend comprises about 0.05 to 2.5 weight % of said elastomer.

10. A film of claim 1 which has a blocking force of less than about 50 grams, in which said LLDPE has a density in the range of about 0.90 to 0.935, in which said vulcanized ethylene-propylene elastomer is selected from EPM and EPDM having a hardness of less than about 50D.

11. A polymer blend comprising LLDPE and vulcanized ethylene-propylene elastomer in an amount up to 10% in the absence of additional antiblock additives, the amount of said vulcanized ethylene-propylene elastomer in said blend being sufficient, when said blend is extruded into a film, to result in a film having a blocking force, when measured by ASTM method D-3354, of less than about 100 grams.

12. A blend of claim 11 in which the amount of said vulcanized ethylene-propylene elastomer is sufficient, when said blend is extruded into a film, to result in a film which has a blocking force of less than about 50 grams.

13. A blend of claim 11 in which said LLDPE has a density in the range of about 0.90 to 0.935.

14. A blend of claim 11 in which said vulcanized ethylene-propylene elastomer is selected from EPM and EPDM.

15. A blend of claim 14 in which said EPM or EPDM contain between about 48 and 80 weight percent ethylene.

16. A blend of claim 14 in which said vulcanized ethylene-propylene elastomer has a hardness of less than about 50D, measured using ASTM D-2240.

17. A blend of claim 14 in which said vulcanized ethylene-propylene elastomer has a hardness of less than about 87A, measured using ASTM D-2240.

18. A blend of claim 11 in which said blend comprises about 0.025 to 10 weight % of said elastomer.

19. A blend of claim 18 in which said blend comprises about 0.05 to 2.5 weight % of said elastomer.

20. A blend of claim 11 in which the amount of said vulcanized ethylene-propylene elastomer is sufficient, when said blend is extruded into a film, to result in a film which has a blocking force of less than about 50 grams, in which said LLDPE has a density in the range of about 0.90 to 0.935, in which said vulcanized ethylene-propylene elastomer is selected from EPM and EPDM having a hardness of less than about 50D.

* * * * *